(12) United States Patent
Dettinger et al.

(10) Patent No.: US 8,458,215 B2
(45) Date of Patent: Jun. 4, 2013

(54) DYNAMIC FUNCTIONAL MODULE AVAILABILITY

(75) Inventors: Richard D. Dettinger, Rochester, MN (US); Terrence R. O'Brien, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 2065 days.

(21) Appl. No.: 10/720,960

(22) Filed: Nov. 24, 2003

(65) Prior Publication Data

US 2005/0114288 A1 May 26, 2005

(51) Int. Cl.
*G06F 17/30* (2006.01)

(52) U.S. Cl.
USPC ............ 707/781; 707/783; 707/785; 707/722

(58) Field of Classification Search
USPC ............... 709/229; 704/4; 707/781, 783, 785, 707/722
See application file for complete search history.

(56) References Cited

U.S. PATENT DOCUMENTS

| | | | |
|---|---|---|---|
| 5,253,362 A | 10/1993 | Nolan et al. | |
| 5,640,550 A | 6/1997 | Coker | |
| 5,734,887 A | 3/1998 | Kingberg et al. | |
| 6,041,326 A | 3/2000 | Amro et al. | |
| 6,360,223 B1 | 3/2002 | Ng et al. | |
| 6,430,556 B1 * | 8/2002 | Goldberg et al. | 707/4 |
| 6,453,353 B1 * | 9/2002 | Win et al. | 709/229 |
| 6,460,043 B1 | 10/2002 | Tabbara et al. | |
| 6,553,368 B2 | 4/2003 | Martin et al. | |
| 6,560,606 B1 | 5/2003 | Young | |
| 6,583,799 B1 | 6/2003 | Manolis et al. | |
| 6,601,065 B1 | 7/2003 | Nelson et al. | |
| 6,725,227 B1 | 4/2004 | Li | |
| 6,757,898 B1 * | 6/2004 | Ilsen et al. | 709/203 |
| 6,782,531 B2 | 8/2004 | Young | |
| 6,803,927 B1 | 10/2004 | Sahoo | |
| 6,820,076 B2 | 11/2004 | Bailey et al. | |
| 6,928,431 B2 | 8/2005 | Dettinger et al. | |
| 6,938,035 B2 * | 8/2005 | Driesch et al. | 1/1 |
| 6,954,748 B2 | 10/2005 | Dettinger et al. | |
| 6,968,509 B1 * | 11/2005 | Chang et al. | 715/802 |
| 6,996,558 B2 | 2/2006 | Dettinger et al. | |
| 7,024,425 B2 | 4/2006 | Krishnaprasad et al. | |
| 7,027,975 B1 * | 4/2006 | Pazandak et al. | 704/9 |
| 7,096,229 B2 | 8/2006 | Dettinger et al. | |
| 2002/0083075 A1 * | 6/2002 | Brummel et al. | 707/102 |
| 2002/0091836 A1 * | 7/2002 | Moetteli | 709/227 |

(Continued)

OTHER PUBLICATIONS

Dettinger et al., IBM U.S. Appl. No. 10/083.075, filed Feb. 26, 2002. "Application Portability and Extensibility Through Database Schema and Query Abstraction".
Llama, "Search Your Database", Jan. 18, 2002, Codewalkers, pp. 1-4.
Meng, Weiyi, et al, "A Theory of Translation from Relational Queries to Hierarchical Queries", Apr. 1995, IEEE, pp. 228-245.

*Primary Examiner* — Mahesh Dwivedi
(74) *Attorney, Agent, or Firm* — Patterson & Sheridan, LLP

(57) ABSTRACT

The present invention generally is directed to a system, method and article of manufacture for accessing data independent of the particular manner in which the data is physically represented. In one embodiment, a data repository abstraction layer provides a logical view of the underlying data repository that is independent of the particular manner of data representation. A query abstraction layer is also provided and is based on the data repository abstraction layer. A runtime component performs translation of an abstract query into a form that can be used against a particular physical data representation.

12 Claims, 9 Drawing Sheets

U.S. PATENT DOCUMENTS

| | | | |
|---|---|---|---|
| 2002/0147724 A1* | 10/2002 | Fries et al. | 707/100 |
| 2003/0065648 A1* | 4/2003 | Driesch et al. | 707/2 |
| 2003/0140043 A1* | 7/2003 | Hotchkiss et al. | 707/10 |
| 2003/0158839 A1* | 8/2003 | Faybishenko et al. | 707/3 |
| 2003/0229623 A1* | 12/2003 | Chang et al. | 707/3 |
| 2004/0010791 A1 | 1/2004 | Jain et al. | |
| 2004/0073782 A1 | 4/2004 | Price et al. | |
| 2004/0205695 A1 | 10/2004 | Fletcher | |
| 2004/0249674 A1* | 12/2004 | Eisenberg et al. | 705/2 |
| 2005/0080656 A1* | 4/2005 | Crow et al. | 705/8 |

* cited by examiner

DYNAMIC FUNCTIONAL MODULE AVAILABILITY

CROSS-REFERENCE TO RELATED APPLICATIONS

The present invention is related to the commonly owned, co-pending U.S. patent application Ser. No. 10/083,075, entitled "Application Portability And Extensibility Through Database Schema And Query Abstraction," filed Feb. 26, 2002, and commonly owned co-pending application Ser. No. 10/720,963, entitled "Method For Invoking And Integrating Multiple Functional Modules," filed herewith, which are herein incorporated by reference.

BACKGROUND OF THE INVENTION

1. Field of the Invention

The present invention generally relates to data processing and more particularly to making available to the user only those functional modules that meet specified requirements.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In accordance with the EJB specification, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application built and deployment cycle to react to reorganization of the underlying physical data model or to support alternative data representations. EJB programming also requires specialized skills, since more advanced Java programming techniques are involved. Accordingly, the EJB approach and other similar approaches are rather inflexible and costly to maintain for general-purpose query applications accessing an evolving physical data model.

Another shortcoming of the prior art, is the manner in which information can be presented to the user. A number of software solutions support the use of user-defined queries, in which the user is provided with a "query-building" tool to construct a query that meets the user's specific data selection requirements. Often, the query building tool will present the user with a list of functional modules to choose from when building the query. Functional modules that aid in the analysis of query results may also be provided. Unfortunately, the user must know the precise number, order, and data type of each parameter required to utilize the functional module. Keeping users informed of all the accessible modules and their features is an inconvenient and inefficient process.

Further, while the number of functional modules presented to the user may be vast, only a limited subset may actually be of interest. Therefore, nonessential functional modules are revealed to the end user, which may make it difficult to analyze query results in a desired manner, as the nonessential functional modules must be filtered out by the user. In other words, in a conventional processing environment, all accessible functional modules are made available indiscriminately even though individual groups within the entity (teams, workgroups, departments, etc.) are typically only interested in a limited portion of the functional modules. For example, in a medical research facility, a hemotology research group may only be interested in a limited number of medical testing based functional modules, while the processing environment may encompass thousands of functional modules providing a vast array of functionality along with medical testing.

Accordingly, when building a query, members of the hemotology research group may spend a lot of effort just to filter through the large number of functional modules for which they have no interest.

Therefore, there is a need for an improved and more flexible method for presenting, to a user, a limited subset of all possible functional modules to choose from when building a query. Preferably, the limited subset of functional modules will only include those of interest to the user.

SUMMARY OF THE INVENTION

The present invention generally provides methods, articles of manufacture and systems for making available and presenting, to a user, a limited subset of all possible functional modules.

For some embodiments, a method of providing a user access to functional modules from within an application generally includes collecting runtime metadata relating to the application, obtaining a list of all functional modules accessible from within the application, identifying a limited subset of the functional modules that will successfully execute, based on the runtime metadata and metadata associated with the functional modules, and providing an interface presenting the user with the limited subset of functional modules that will successfully execute.

For some embodiments, a method of providing a user access to functional modules from within an application used to build queries, issue queries and/or view query results during a query session generally includes collecting runtime metadata relating to the query session, obtaining a list of all functional modules accessible from within the application, identifying a limited subset of the functional modules that will successfully execute, based on the runtime metadata and metadata associated with functional modules, and providing an interface presenting the user with a the limited subset of functional modules that will successfully execute.

For some embodiments, the article of manufacture generally includes a computer readable medium containing a program which, when executed, performs operations for providing a user access to functional modules from within an application. The operations generally include collecting runtime metadata relating to the application, obtaining a list of all functional modules accessible from within the application, identifying a limited subset of the functional modules that will successfully execute, based on the runtime metadata, and providing an interface presenting the user with the limited subset of functional modules that will successfully execute.

For some embodiments, a system for providing a user access to functional modules generally includes a plurality of functional modules, each having associated metadata, an application from which the functional modules are accessible, wherein the application is configured to collect metadata and present to a user a limited subset of the functional modules, based on the runtime metadata and the metadata associated with the functional modules.

For some embodiments, a data processing system for providing a user access to functional modules from within an application generally includes a data repository, a plurality of functional modules, each having associated metadata, an application from which the functional modules are accessible, wherein the application is configured to collect metadata and present to a user a limited subset of the functional modules, based on the runtime metadata and the metadata associated with the functional modules.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to methods, articles of manufacture and systems for presenting, to a user, a limited subset of functional modules of a system. The limited subset of functional modules may be selected according to any appropriate technique including the process of relating metadata to attributes of available functional modules.

As used herein, the phrase functional module generally refers to a set of coded instructions that enable a computer to perform a specified function. Plug-in components, analysis routines, functions or programs among other terms may constitute functional modules. Further, functional modules may be implemented internally or externally to a system, while remaining accessible by that system. While a functional module may exist in any or all of these forms, to facilitate understanding, the term plug-in will be used to refer to any functional module described herein. While the following description focuses on selecting the subset of plug-ins related to an application designed for the building and initiating of a query, those skilled in the art will recognize the methods described herein may be used with any applications that utilize plug-ins or other type of functional modules.

As used herein, the term metadata refers to descriptive information including: the attributes of a processing environment, an application, users of the application and other managed data in the system. Metadata based on managed data includes descriptive information about the context and characteristics of data managed within the system. Security oriented user information, such as user credentials, and user invoked session information also constitutes metadata.

Further, as used herein, the term user may generally apply to any entity utilizing the data processing system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

Exemplary Application Environment

Figure 1:
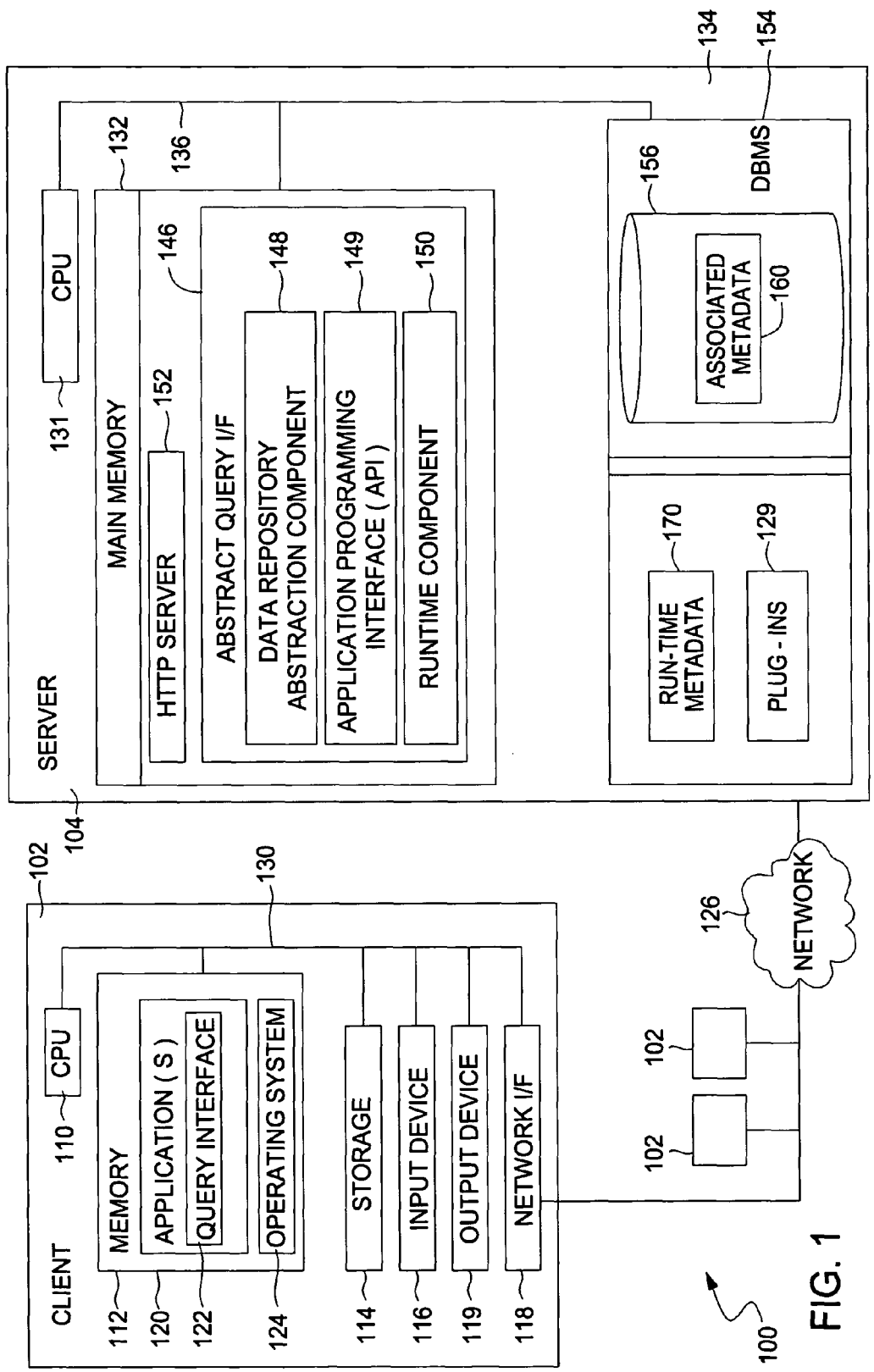
FIG. 1 is a computer system illustratively utilized in accordance with the present invention.

FIG. 1 shows an exemplary networked computer system 100, in which embodiments of the present invention may be utilized. For example, embodiments of the present invention may be implemented as a program product for use with the system 100, to select a subset of available plug-in components, or plug-ins 129, based on related run time metadata 170. The user (e.g., a user of an application 120 running on a client computer 102) is presented with a limited subset of available plug-ins 129 in order to perform desired functions or actions. The exact functions performed by the plug-ins may vary. For example, certain plug-ins may facilitate query building, while others may perform data analysis or provide printing support.

The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

As illustrated in FIG. 1, the system 100 generally includes client computers 102 and at least one server computer 104, connected via a network 126. In general, the network 126 may be a local area network (LAN) and/or a wide area network (WAN). In a particular embodiment, the network 126 is the Internet.

As illustrated, the client computers 102 generally include a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a client 102 may include a display screen with an integrated touch-screen or a display with an integrated keyboard.

The network interface device 118 may be any entry/exit device configured to allow network communications between the client 102 and the server 104 via the network 126. For example, the network interface device 118 may be a network adapter or other network interface card (NIC). If the client 102 is a handheld device, such as a personal digital assistant (PDA), the network interface device 118 may comprise any suitable wireless interface to provide a wireless connection to the network 126.

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Examples of suitable operating systems, which may be used to advantage, include Linux and Microsoft's Windows®, as well as any operating systems designed for handheld devices, such as Palm OS®, Windows® CE, and the like. More generally, any operating system supporting the functions disclosed herein may be used.

The memory 112 is also shown containing a query building interface 122, such as a browser program, that, when executed on CPU 110, provides support for building queries based on the data repository abstraction component 148. In one embodiment, the query interface 122 includes a web-based Graphical User Interface (GUI), which allows the user to display Hyper Text Markup Language (HTML) information. Functionality of the query interface 122 may be enhanced through the availability of one or more plug-in components (shown as plug-ins 129).

The plug-ins 129 are illustratively implemented on the server computer 104 and may deliver results to a user on the client computer 102 or any other computer in the system. Plug-ins 129 may also deliver results to other plug-ins accessible by the system. Further, plug-ins may be implemented or executed or both on any internal or external clients 102 of a networked system and interact with users (including applications) on any of the clients 102.

The server 104 may be physically arranged in a manner similar to the client computer 102. Accordingly, the server 104 is shown generally comprising a CPU 130, a memory 132, and a storage device 134, coupled to one another by a bus 136. Memory 132 may be a random access memory sufficiently large to hold the necessary programming and data structures that are located on the server 104.

The server 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used. As illustrated, the server 104 may be configured with an abstract query interface 146 for issuing abstract queries (e.g., received from the client application 120) against one or more of the databases 156.

In one embodiment, elements of a query are specified by a user through the query building interface 122 which may be implemented as a browser program presenting a set of GUI screens for building queries. The content of the GUI screens may be generated by application(s) 120. In a particular embodiment, the GUI content is hypertext markup language (HTML) content which may be rendered on the client computer systems 102 with the query building interface 122. Accordingly, the memory 132 may include a Hypertext Transfer Protocol (http) server process 138 (e.g., a web server) adapted to service requests from the client computer 102. For example, the server process 152 may respond to requests to access the database(s) 156, which illustratively resides on the server 104. Incoming client requests for data from a database 156 invoke an application 120 which, when executed by the processor 130, perform operations necessary to access the database(s) 156. In one embodiment, the application 120 comprises a plurality of servlets configured to build GUI elements, which are then rendered by the query interface 122.

As previously described, the application 120 may also present the user with one or more of the plug-ins 129, available via the query interface 122. In some embodiments, a subset of plug-ins 129 is selected based on successfully relating attributes of the plug-ins with associated metadata 160 and runtime metadata 170. Associated metadata 160 may include plug-in information such as the functional concept or context of the plug-in, the number and type of input and output (I/O) parameters and security requirements. Further, associated metadata 160 may be stored in a variety of data structures or objects including XML based data structures or tables in relational databases. Runtime metadata 170, also storable in various data structures or objects, may indicate whether a plug-in's 129 I/O parameter and security requirements are satisfied and, therefore, whether the plug-in 129 is executable.

Runtime metadata 170 may also include system state information such as the server computer's 104 CPU utilization, memory allocation and hard disk I/O contention among other metrics. System state information may also include system resource availability such as available memory and CPU capacity. For example, only plug-ins that can be executed with the available system resources would be included in the subset of plug-ins 129 selected.

An Exemplary Runtime Environment

Figure 2A:
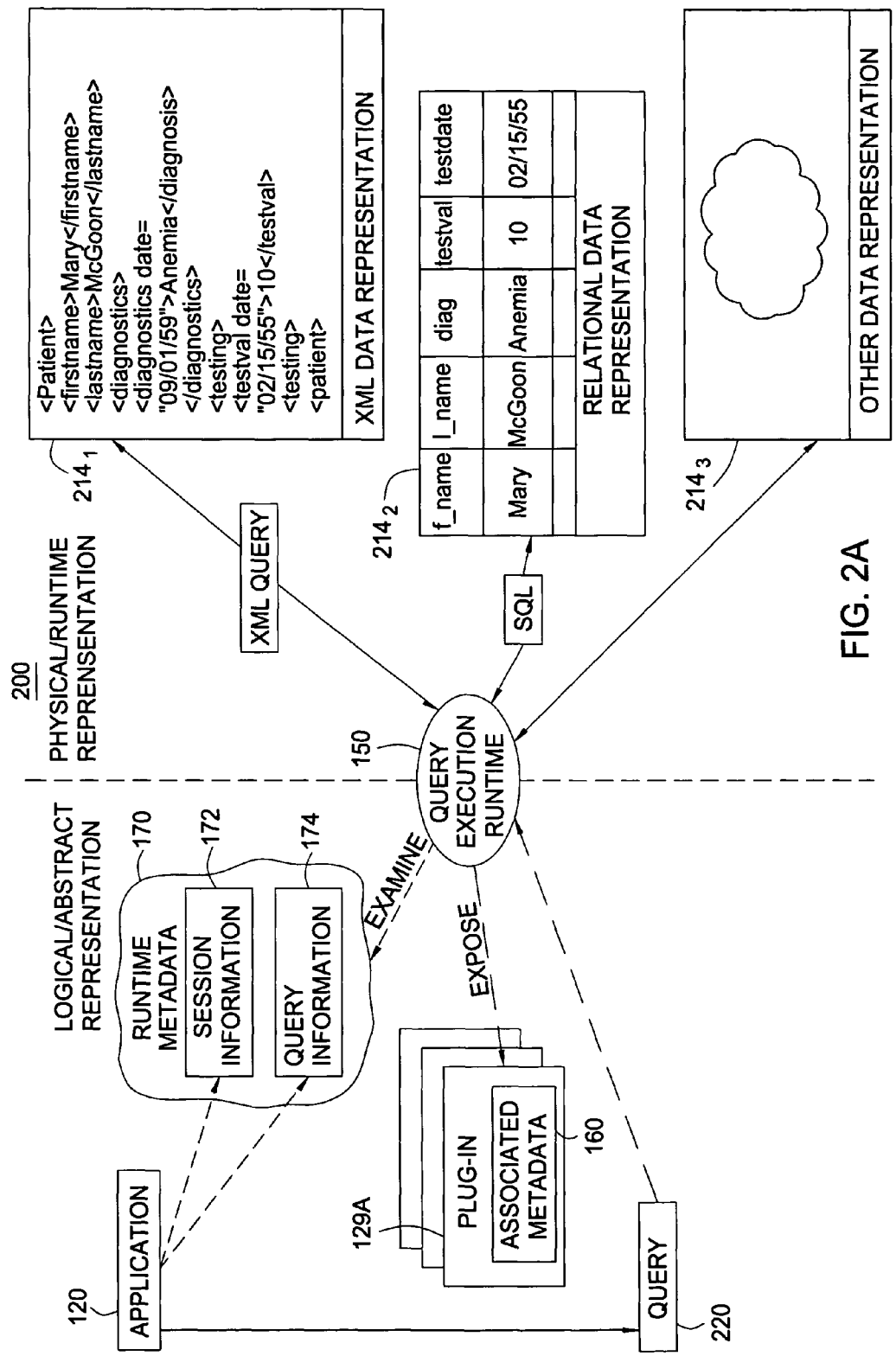
FIGS. 2A and 2B provide a relational view of software components, including plug-in components and metadata, of one embodiment of the present invention.

Before describing the process of selecting a subset of available plug-ins 129 in detail, however, operation of the various illustrated components of the query interface 122 will be described with reference to FIGS. 2A and 2B. FIG. 2A illustrates a relational view of a client application 120, plug-in components 129 and their associated metadata 160 while building a query, according to one embodiment of the invention. As shown, the application 120 may be used to build a query 220 based on a set of plug-ins $129_A$, available during query building. The set of plug-ins $129_A$ available to the application at this point is determined by the associated metadata 160 of the plug-ins $129_A$. For example, for an application to utilize plug-ins to build a query, the application will need to pass prospective plug-ins certain parameters, including I/O parameters, related to components (columns, tables, etc.) of the query needing to be built. All of the data values needed to be passed as parameters may be available as query information 174 in the runtime metadata 170. Examples of components of the query might be names of columns and tables among other identifiers. In order for a plug-in to be successfully called, or executed, its requirements described by associated metadata 160 needs to be met by parameters available to the calling application. If the available parameters match all the plug-in's associated metadata 160, that plug-in will be placed on the list of available plug-ins 129. Further, some plug-ins may only be available to certain authorized users determined by session information 172 available in the runtime metadata 170.

Figure 2B:
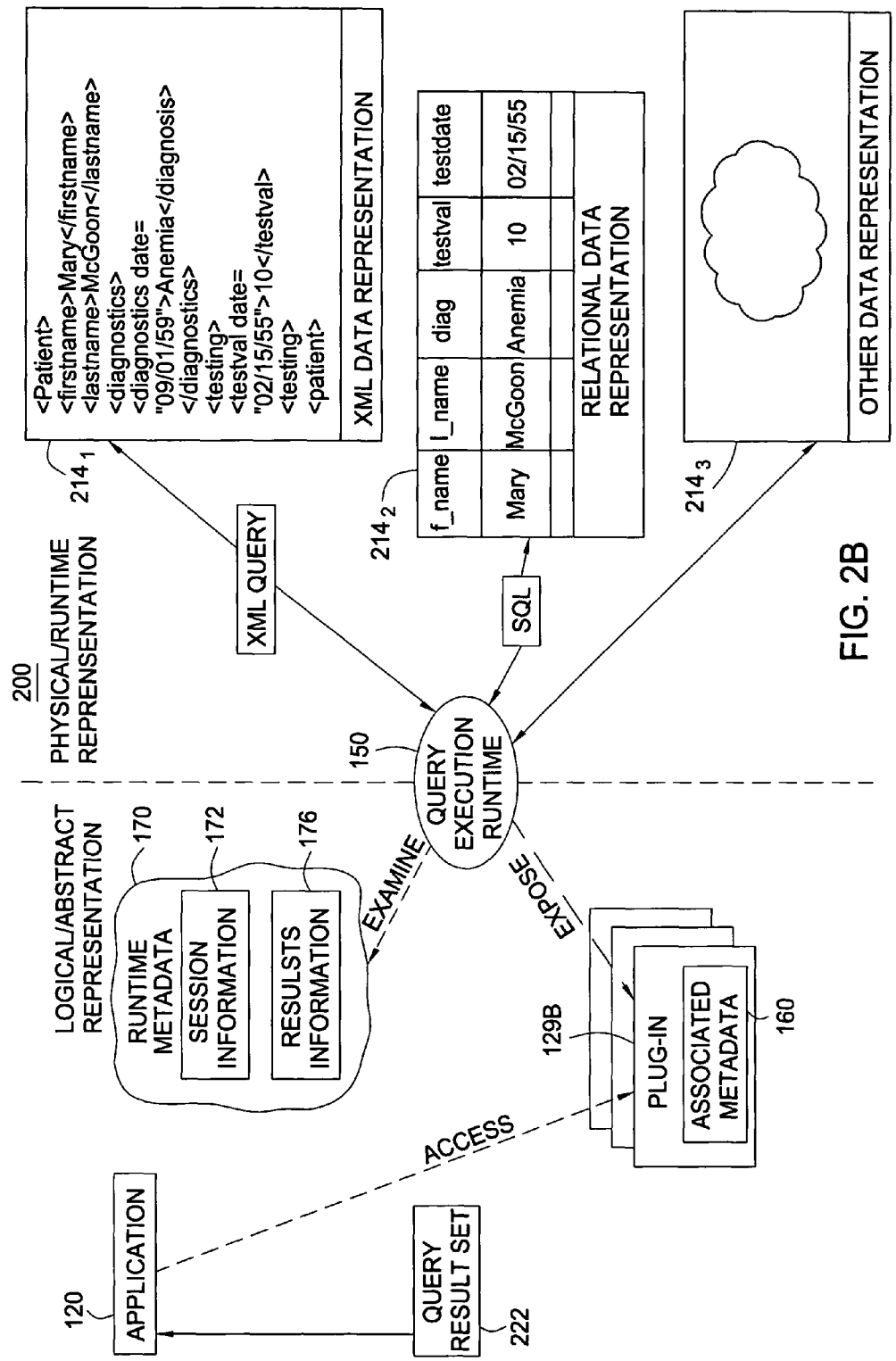

FIG. 2B illustrates the relational view of the application 120, plug-ins 129 and runtime metadata 170 after the query 220 described in FIG. 2A is executed. Information describing the session from which the query 220 was executed is collected as runtime metadata 170. Runtime metadata 170 also includes information describing the query's 220 results metadata 176 (information describing query's 220 result set 222) based on the result set 222 returned by the query execution runtime 150 module. Based on the newly acquired runtime metadata 170, the application may now require a second list (different from the original list shown in FIG. 2A) of plug-ins $129_B$ for performing more operations, such as analyzing the result set 222 of the query 220. For example, if the data returned by the query execution runtime 150 needs to be normalized, a list of appropriate plug-ins providing normalization functionality, rather than query building functionality, needs to be generated. To generate the new list of plug-ins $129_B$, parameters available to the calling application must again match the associated metadata 160 of accessible plug-ins in order for those plug-ins to be made available, as described earlier. Further, the session information 172 must indicate the user is authorized to access the plug-ins 129.

For some embodiments, the query 220 may be an abstract query including a set of one or more query conditions and a specified result set, each based on logical fields defined in the DRA component 148 (shown in FIG. 1). As previously described, abstract queries may be executed by the query execution component 150. In the exemplary abstract data model, the logical fields are defined independently of the underlying data representation being used in the DBMS 154, thereby allowing queries to be formed that are loosely coupled to the underlying data representation 214. The query execution component 150 is generally configured to transform abstract queries into concrete queries compatible with the physical data representation (e.g., an XML representation $214_1$, an SQL representation $214_2$, or any other type of representation $214_3$), by mapping the logical fields of the abstract queries to the corresponding physical fields of the physical data representation 214. The mapping of abstract queries to concrete queries, by the query execution component 150, is described in detail in the previously referenced co-pending application Ser. No. 10/083,075.

Generating a List of Available Plug-Ins

Figure 3A:
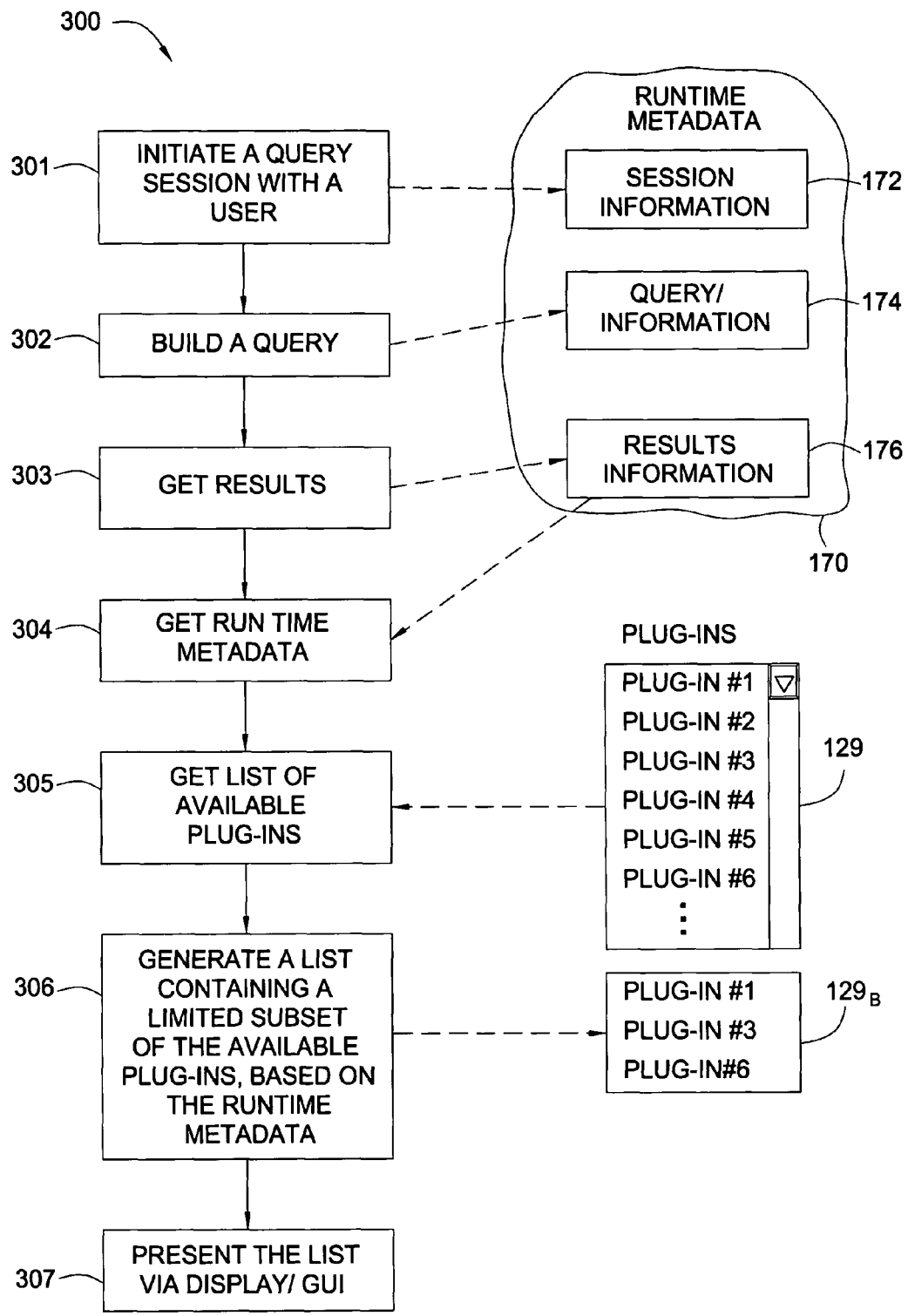
FIG. 3A is a flow chart illustrating exemplary operations for presenting a user with a limited subset of plug-in components from all available plug-in components according to aspects of the present invention.

FIG. 3A is a flow diagram of exemplary operations 300 for the conceptual selection of a subset of available plug-ins. The operations 300 may be described with reference to FIGS. 2A and 2B and may be performed, for example, in preparation of, or as part of, a query session. For some embodiments, the operations 300 may be performed to build a query or analyze query results or both and dynamically present the user with a subset of available plug-ins that properly correspond to runtime metadata 170 and metadata 160 associated with a larger set of existing plug-ins.

The operation 300 begins, at step 301, when a query session is initiated by a user. As illustrated, when the query session is initiated, runtime metadata 170 may include session information 172, such as the user's login ID, the user's security credentials and other information obtained while a user's session remains active. Upon session initiation, a set of plug-ins may be presented to the user to begin performing functions. The initial set of plug-ins may be limited to those where the plug-ins' requirements are met by the runtime metadata 170. For example, if the session information 172 within the runtime metadata 170 shows that a user is authorized to access a certain plug-in, that plug-in will be among the limited subset of plug-ins made available to the user upon session initiation.

At step 302, the user may build a query, for example, by utilizing the initial set of plug-ins made available upon session initiation. Detailed information pertaining to the query, such as identifiers referring to tables and columns, is stored in the runtime metadata 170 as query information 174 and may also be used to determine the plug-ins 129 presented to the user. For example, plug-ins 129 related to the query, as determined by the names (or other attributes) of the fields used in query conditions or a specified result set, may be presented to the user.

After the query is built, at step 303, the user submits the query and receives the corresponding results. Detailed results information 176 describing the query results 222, such as column names, datatypes of columns and number of records returned, may also be stored in the runtime metadata 170. Further, results information 176 may also include details of the content returned in the result set 222. In other words, the runtime metadata 170 may indicate the specific data values returned in the result set.

After reviewing the query results, the user may elect to further analyze the query results using specialized analysis based plug-ins. For example, the user may choose to normalize data in the result set by employing an available normalization plug-in. Perhaps the user is not satisfied with the result set and desires to refine the existing query to receive a completely new result set. In either case, at step 304, information is gathered from the runtime metadata 170 to compare with the requirements of system accessible plug-ins 129 gathered at step 305. At step 306, plug-ins with requirements that are met by the runtime metadata, also referred to as available plug-ins $129_B$, are listed. At step 307, the generated list of available plug-ins $129_B$ is presented to the user via a display or graphic user interface (GUI).

Figure 3B:
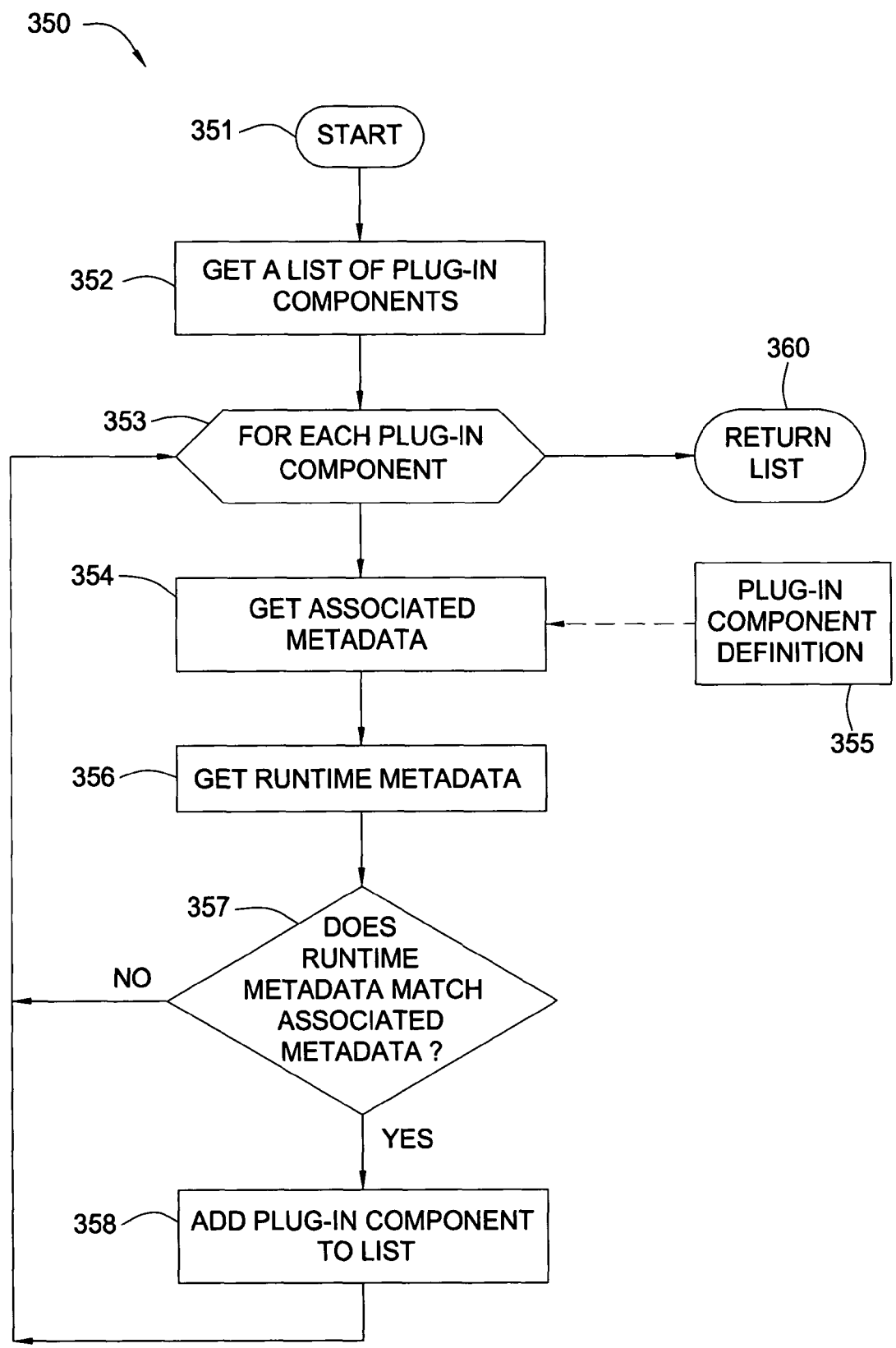
FIG. 3B is a flow chart illustrating exemplary operations for selecting a subset of plug-in components from all available plug-in components based on metadata, according to aspects of the present invention.

Exemplary operations 350 for generating a list of available plug-ins $129_B$ are illustrated in FIG. 3B. The operations 350 begin at step 351 when a user session requests a list of available plug-ins be presented to the user. At step 352, a list of all system accessible plug-ins is obtained. As described earlier, system accessible plug-ins, also known simply as accessible plug-ins, can include programs, functions and applications internal and external to the system. At step 353, a loop of operations (354-358) to be performed for each accessible plug-in 129 is entered.

At step 354, the associated metadata based on the plug-in's definition is obtained. Associated metadata includes the plug-in's signature (or definition) which indicates the number, order and datatypes of parameters required for executing the plug-in. The runtime metadata including user session information, user security credentials, and system state information is obtained at step 356. At step 357 a determination is made as to whether the requirements specified by the accessible plug-in's associated metadata have been met by the runtime metadata. For example, suppose a certain numerical analysis based plug-in requires the user requesting the plug-in to have administrator level security access, and also requires 2 parameters of character and number datatypes to be provided in a specified order. If the plug-in's requirements are met, it is added to the list of available plug-ins, at step 358. Otherwise, it is not. In either case, operations return to step 353 to evaluate the next plug-in. Once the loop of operations have been performed for each plug-in, the list of plug-ins $129_B$ is returned, at step 360.

Exemplary GUI Screens

Figure 4A:
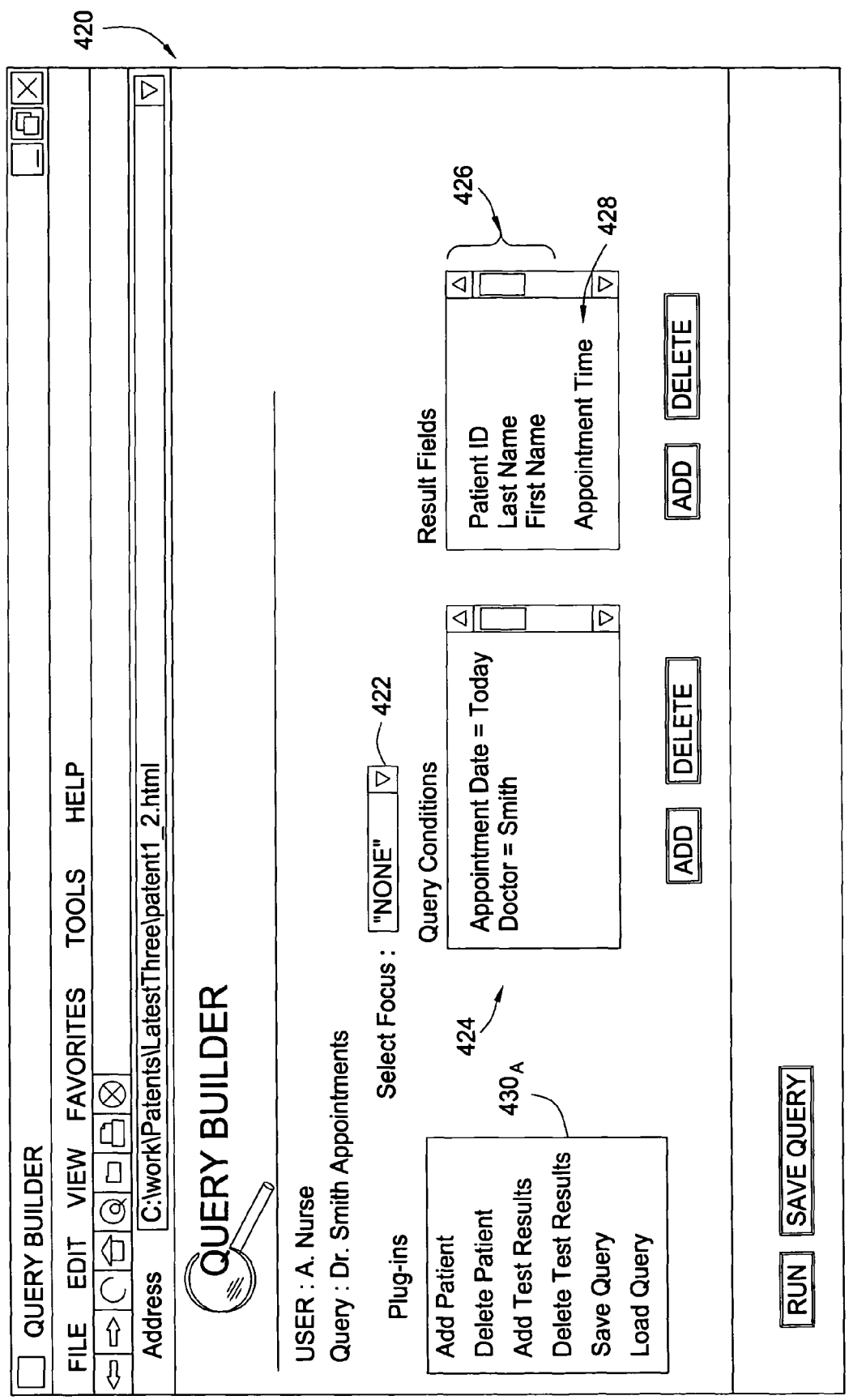
FIGS. 4A-4D illustrate exemplary graphical user interface (GUI) screens in accordance with one embodiment of the present invention.
Figure 4B:
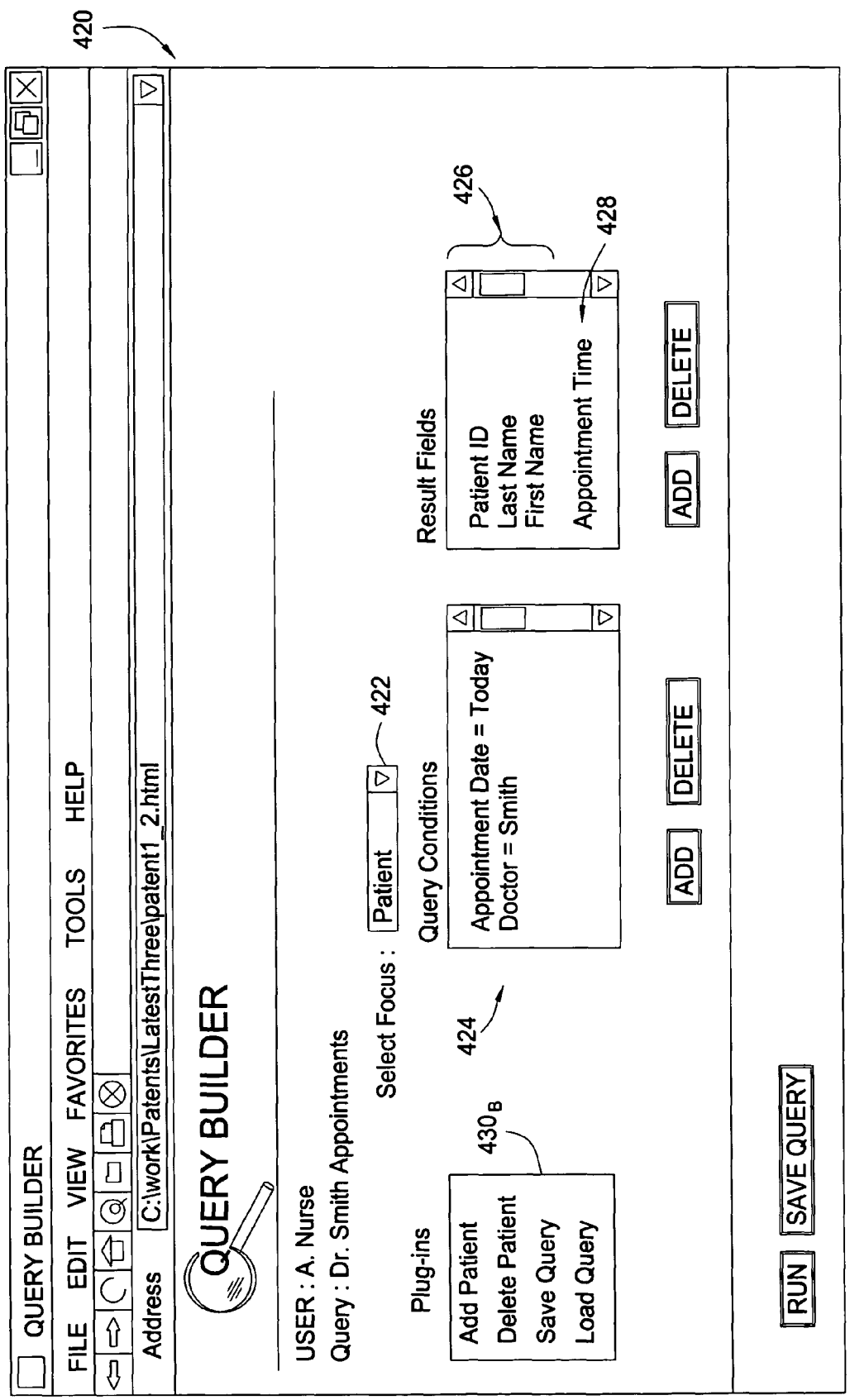
Figure 4C:
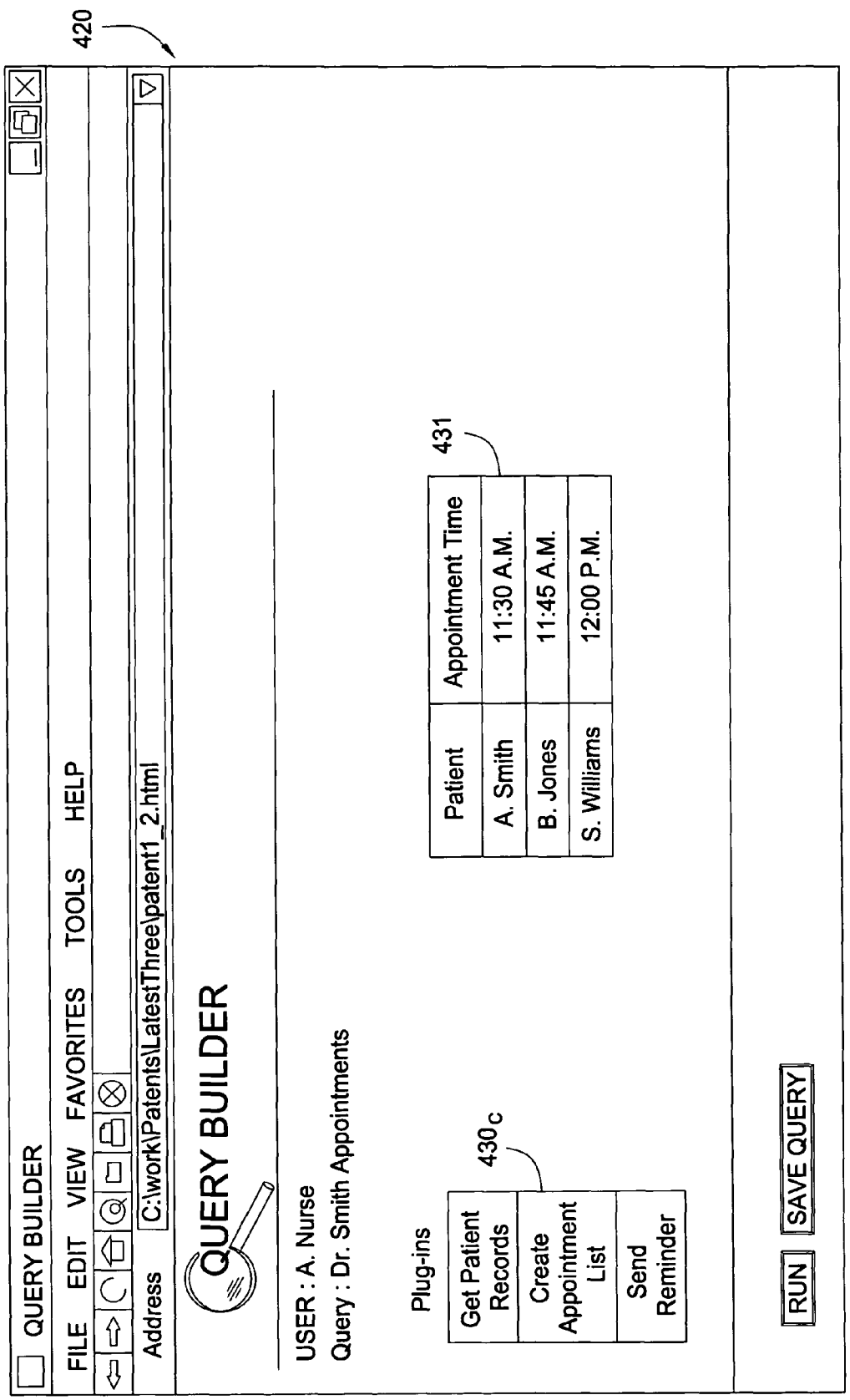

The effect of dynamic plug-in availability may be illustrated by the example GUI screens 400-420 shown in FIGS. 4A-4D. The example in FIGS. 4A, 4B and 4C illustrate a query building session of a nurse generating a list of patients for a doctor. The nurse's security credentials and other user session information is stored in the runtime metadata. Of all the system accessible plug-ins, only plug-ins with requirements that were met by the runtime metadata are presented in the list of available plug-ins $430_A$.

For some embodiments, a user may be able to select a focus for the query that may, for example, automatically include conditions with particular fields, specify particular fields as results, and the like. For example, a user may be able to specify a patient focus, automatically adding patient-related fields (name, patient ID, etc.) to a result set. The concepts of focusing queries are described in the commonly owned, co-pending U.S. patent application Ser. No. 10/403,356, entitled "Dealing With Composite Data Through Data Model Entities," filed Mar. 31, 2003. As illustrated in FIG. 4A, the user has not selected a focus 422 and, therefore, the set of plug-ins 430A are not limited to those related to any specific type focus.

On the other hand, as illustrated in FIG. 4B, if the user specifies a focus (patient in this example) the list of plug-ins $430_B$ available plug-ins is limited. In other words, the runtime metadata is updated to reflect the patient focus. Only plug-ins that adhere to the patient focus should be included on the list of available plug-ins $430_B$. It can be seen that the list of available plug-ins $430_B$ corresponding to the patient focus 422 in FIG. 4B is shorter than the list of available plug-ins $430_A$ in FIG. 4A where no focus 422 is selected, which may facilitate query building.

As previously described, once a query has been issued, runtime metadata 170 may include information describing the returned result set, which may also be used to limit the plug-ins presented to the user. As illustrated in FIG. 4C, the result set 431 correlates to a previously run query which obtains a list of patients having appointments to see a specific doctor on a certain day. Correspondingly, only plug-ins associated with patient appointments are included in the list of available plug-ins $430_C$. For example, the plug-in labeled "Get Patient Records", may be used to gather medical records for all patients with appointments by running a new query related to medical records. The list of patients for which the query should be run may be determined by the patients listed in the result set 431.

The list of available plug-ins $430_C$ may also include external plug-ins, such as the plug-in labeled "Send Reminder", for example. This plug-in may be an external email program utilized to automatically send patients an email reminding them of the appointment.

Figure 4D:
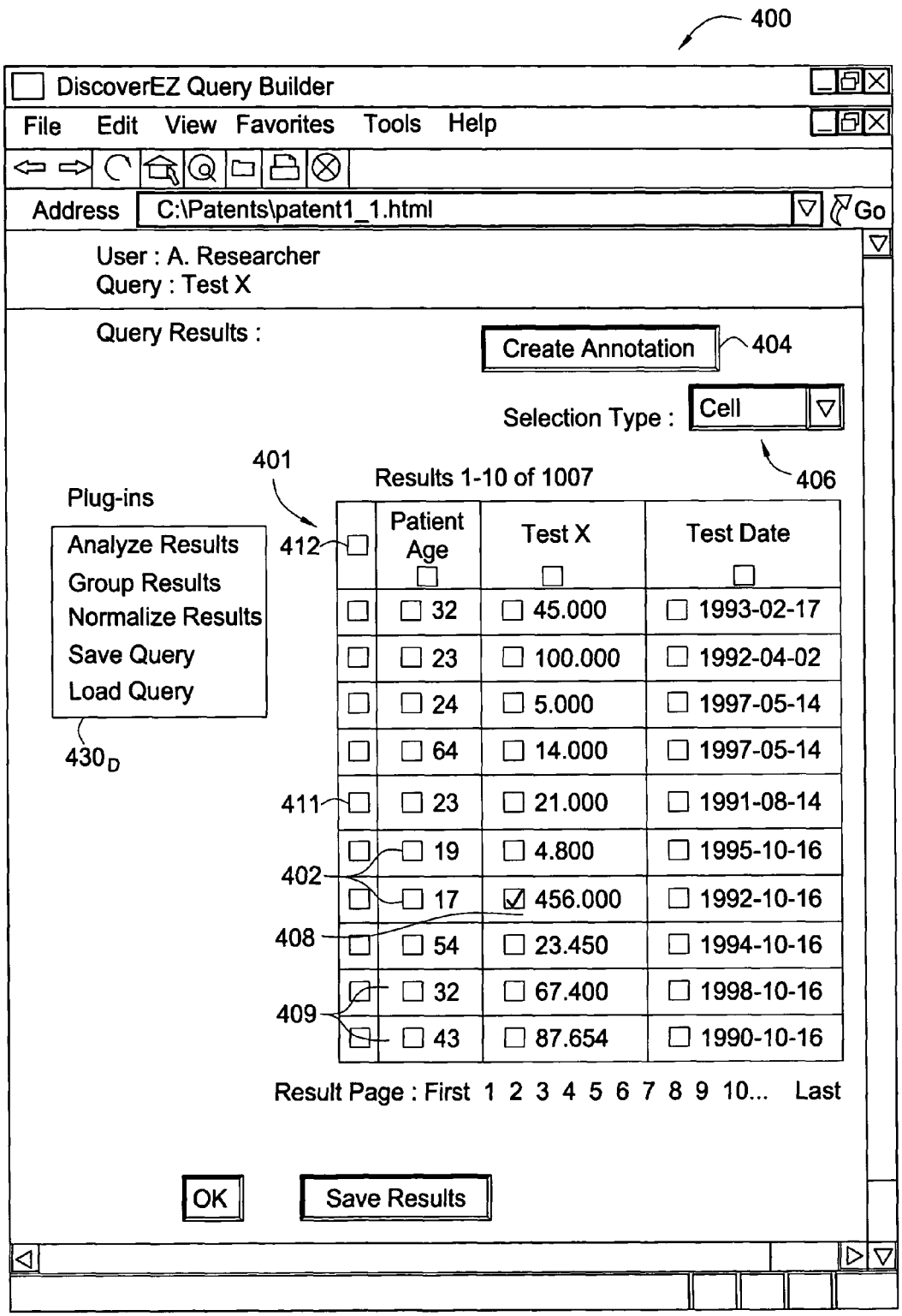

FIG. 4D illustrates exemplary results received from another query (pertaining to test results) that has been issued. The result set 401 shows that various records exist for Test X. The runtime metadata reflects that the result set comprises of Test X related records. Correspondingly, the list of available plug-ins 430$_D$ includes Test X "centric" plug-ins designed to analyze data. For example, a plug-in designed specifically to normalize Test X results (e.g., based on a patient's weight or other factors), may be included on the list of available plug-ins 430$_D$.

For some embodiments, a user may be able to select a limited subset of the result set to analyze. In order to allow this selection, different types of checkboxes 402 may be provided based on a selection type 406. As an example, if a user selects a Cell selection type, checkboxes 402 may be provided adjacent each cell 409 of the result set 401, allowing the user to select any number of individual cells. Alternatively, a user may select a Column selection type, which may result in the display of checkboxes 402 adjacent each column name, allowing the user to select individual columns (e.g., Patient Age, Test X, and Test Date, in this example). Row or table selection types 406 may also be available, allowing users to the select individual rows of results, or the entire table of results, respectively.

Accordingly, the list of available plug-ins 430$_D$ may be modified according to the selection type 406 chosen. In addition, the list of available plug-ins 430B may be filtered further based on the specific check boxes 402 enabled by the user. For example, if a checkbox 402 for the Test X column is selected, plug-ins capable of analyzing Test X results may be included in the list of available plug-ins 430$_D$. If multiple check boxes 402 are enabled, regardless of which row or column they belong to, the list of available plug-ins 430$_D$ may include only those plug-ins capable of accepting and processing all the data elements selected (e.g., if the selected data satisfies all the required inputs indicated by the associated metadata).

CONCLUSION

By limiting the number of functional modules (e.g., plug-in components) presented to a user of an application, the user may be able to find a desired functional module without filtering out (e.g., scrolling through) numerous functional modules that are not of interest (or cannot currently execute successfully). Accordingly, the users experience with the application may be greatly enhanced.

While the foregoing is directed to embodiments of the present invention, other and further embodiments of the invention may be devised without departing from the basic scope thereof, and the scope thereof is determined by the claims that follow.

What is claimed is:

1. A method of providing a user access to functional modules from within a query application, comprising:
    assigning metadata requirements to functional modules that operate on data stored in, or functional modules that generate results that are stored in, a database, wherein the assigned metadata requirements specify conditions required for successful execution of the functional module, wherein at least one condition defines at least one user role required for successful execution of the functional module;
    collecting runtime metadata relating to one or more result fields in a query statement, wherein the one or more result fields specify one or more data fields for which data is requested to be returned upon execution of the query statement, wherein the runtime metadata is collected after composition of the query statement, and wherein the runtime metadata is collected before the query statement is submitted for execution;
    obtaining a list of functional modules that are accessible from within an application used during the query session;
    identifying a limited subset of the functional modules in the list that will successfully execute, by comparing the collected runtime metadata with the assigned metadata requirements; and
    providing an interface presenting the user with the identified limited subset of functional modules that will successfully execute.

2. The method of claim 1, wherein obtaining metadata associated with the functional module comprises examining a signature validation.

3. The method of claim 1, wherein the metadata associated with at least one of the functional modules comprises at least one of: one or more input parameters required for successful execution of the functional module, one or more output parameters required for successful execution of the functional module, and a security credential required to execute the functional module.

4. The method of claim 1, wherein at least one of the functional modules analyzes query results.

5. The method of claim 1, wherein the runtime metadata relating to one or more result fields in the query statement comprises one or more of:
    a result field name; and
    a data type for the result field.

6. A non-transitory computer readable storage medium containing a program which, when executed, performs operations for providing a user access to functional modules from within an application, comprising:
    assigning metadata requirements to functional modules that operate on data stored in, or functional modules that generate results that are stored in, a database, wherein the assigned metadata requirements specify conditions required for successful execution of the functional module, wherein at least one condition defines at least one user role required for successful execution of the functional module;
    collecting runtime metadata relating to one or more result fields in a query statement, wherein the one or more result fields specify one or more data fields for which data is requested to be returned upon execution of the query statement, wherein the runtime metadata is collected after composition of the query statement, and wherein the runtime metadata is collected before the query statement is submitted for execution;
    obtaining a list of functional modules accessible from within the application;
    identifying a limited subset of functional modules that will successfully execute, by comparing the collected runtime metadata with the assigned metadata requirements; and
    providing an interface presenting the user with the identified limited subset of functional modules that will successfully execute.

7. The non-transitory computer readable storage medium of claim 6 wherein the application is a query building application.

8. The non-transitory computer readable storage medium of claim 6, wherein the runtime metadata relating to one or more result fields in the query statement comprises one or more of:
- a result field name; and
- a data type for the result field.

9. A data processing system for providing a user access to functional modules from within an application comprising:
- a data repository;
- a plurality of functional modules, each having associated metadata requirements that specify conditions required for successful execution of the functional modules, wherein at least one condition defines at least one user role required for successful execution of the functional modules;
- an application from which the functional modules are accessible, wherein the application is configured to:
  - after composition of a query statement, but before the query statement is submitted for execution, collect runtime metadata related to one or more result fields in the query statement, wherein the one or more result fields specify one or more data fields for which data is requested to be returned upon execution of the query statement; and
  - present to a user a limited subset of the functional modules that will successfully execute, as determined by the application based on the collected runtime metadata and the metadata requirements associated with the functional modules.

10. The data processing system of claim 9, wherein the data repository comprises XML data structures used to store runtime metadata.

11. The data processing system of claim 9, wherein the data repository comprises relational database tables used to store runtime metadata.

12. The data processing system of claim 9, wherein the runtime metadata related to one or more result fields in the query statement comprises one or more of:
- a result field name; and
- a data type for the result field.

* * * * *